United States Patent
Hsu

(10) Patent No.: US 10,755,417 B2
(45) Date of Patent: *Aug. 25, 2020

(54) DETECTION SYSTEM

(71) Applicant: PIXART IMAGING INC., Hsin-chu (TW)

(72) Inventor: En Feng Hsu, Hsin-chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/284,553

(22) Filed: Feb. 25, 2019

(65) Prior Publication Data

US 2019/0188860 A1 Jun. 20, 2019

Related U.S. Application Data

(63) Continuation of application No. 15/590,133, filed on May 9, 2017, now Pat. No. 10,255,682, which is a (Continued)

(30) Foreign Application Priority Data

Oct. 31, 2012 (TW) .............................. 101140233 A

(51) Int. Cl.
*G06T 7/194* (2017.01)
*H04N 5/222* (2006.01)
(Continued)

(52) U.S. Cl.
CPC ................ *G06T 7/194* (2017.01); *G02B 7/36* (2013.01); *G06K 9/00355* (2013.01);
(Continued)

(58) Field of Classification Search
CPC . G02B 7/09; G02B 7/36; G03B 13/30; G06K 9/00355; G06K 9/2027;
(Continued)

(56) References Cited

U.S. PATENT DOCUMENTS 7,697,062 B2 4/2010 Wernersson
2002/0113882 A1 8/2002 Pollard et al.
(Continued)

FOREIGN PATENT DOCUMENTS

CN 1685219 A 10/2005
CN 201828525 U 5/2011
(Continued)

OTHER PUBLICATIONS

Chern et al., "Practical Issues on Pixel-Based Autofocusing for Machine Vision," Proceedings of the 2001 IEEE International Conference on Robotics & Automation. Seoul, Korea, May 21-26, 2001, pp. 2791-2796.
(Continued)

*Primary Examiner* — James T Boylan
(74) *Attorney, Agent, or Firm* — Juan Carlos A. Marquez; Marquez IP Law Office, PLLC

(57) ABSTRACT

The present disclosure provides a detection system, which includes an image sensor, a lens device, and a processor. The image sensor is configured to take a first picture of a foreground object and a background object. The lens device is attached to the image sensor and configured to allow the foreground object to form a clear image on the first picture and the background object to form a blurred image on the first picture. The processor is configured to determine the image of the foreground object by analyzing the sharpness of the images of the first pictures.

1 Claim, 10 Drawing Sheets

Related U.S. Application Data continuation of application No. 13/926,560, filed on Jun. 25, 2013, now Pat. No. 9,684,840.

(51) Int. Cl.

| | |
|---|---|
| H04N 5/225 | (2006.01) |
| G06K 9/00 | (2006.01) |
| G06K 9/20 | (2006.01) |
| G06T 7/571 | (2017.01) |
| G02B 7/36 | (2006.01) |
| G06T 7/174 | (2017.01) |
| G02B 7/09 | (2006.01) |
| G03B 13/30 | (2006.01) |
| H04N 5/232 | (2006.01) |

(52) U.S. Cl.
CPC ............ *G06K 9/2027* (2013.01); *G06T 7/571* (2017.01); *H04N 5/2226* (2013.01); *H04N 5/2256* (2013.01); *G02B 7/09* (2013.01); *G03B 13/30* (2013.01); *G06T 7/174* (2017.01); *H04N 5/23296* (2013.01)

(58) Field of Classification Search
CPC ......... G06T 7/174; G06T 7/194; G06T 7/571; H04N 5/2226; H04N 5/2256; H04N 5/23296
USPC ........................................... 348/164
See application file for complete search history.

(56) References Cited

U.S. PATENT DOCUMENTS

| | | | |
|---|---|---|---|
| 2002/0158976 A1* | 10/2002 | Vni | A61B 1/041 348/243 |
| 2003/0052988 A1 | 3/2003 | Kurosawa | |
| 2003/0063191 A1 | 4/2003 | Challapoli et al. | |
| 2004/0080623 A1 | 4/2004 | Cleveland et al. | |
| 2004/0228508 A1* | 11/2004 | Shigeta | G06K 9/00026 382/124 |
| 2005/0157204 A1* | 7/2005 | Marks | H04N 5/2352 348/370 |
| 2007/0263099 A1 | 11/2007 | Motta et al. | |
| 2008/0025628 A1* | 1/2008 | De Haan | G06T 5/003 382/255 |
| 2008/0035731 A1 | 2/2008 | Brock | |
| 2008/0316328 A1* | 12/2008 | Steinberg | G06K 9/036 348/222.1 |
| 2009/0066782 A1 | 3/2009 | Choi et al. | |
| 2009/0091554 A1 | 4/2009 | Keam | |
| 2009/0175555 A1* | 7/2009 | Mahowald | H04N 5/23232 382/274 |
| 2011/0175984 A1 | 7/2011 | Tolstaya et al. | |
| 2012/0044363 A1 | 2/2012 | Lu et al. | |
| 2013/0163666 A1 | 6/2013 | Leontaris et al. | |
| 2014/0022547 A1 | 1/2014 | Knox et al. | |
| 2014/0028861 A1 | 1/2014 | Holz | |

FOREIGN PATENT DOCUMENTS

| | | |
|---|---|---|
| CN | 102236477 A | 11/2011 |
| CN | 103135853 | 6/2013 |
| DE | 102008047413 A1 | 4/2010 |
| TW | 406250 | 1/2000 |
| TW | 2011443397 A | 12/2001 |
| TW | I322963 | 2/2010 |
| TW | 322963 B | 4/2010 |
| TW | M423406 | 2/2012 |
| WO | 201141780 A2 | 11/2001 |

OTHER PUBLICATIONS

Office Action from Republic of China Intellectual Property Office in the corresponding Taiwan Application 101140233 dated Oct. 6, 2014 9 pp. in Chinese with partial English translation.

Office Action and Search Report from the People's Republic of China State Intellectual Property Office in the corresponding Chinese application 201210438772.3 dated Sep. 6, 2015, 5pp., 1p. English.

\* cited by examiner

DETECTION SYSTEM

CROSS-REFERENCE TO RELATED APPLICATION

This application is a continuation application of U.S. application Ser. No. 13/926,560, filed on Jun. 25, 2013, and U.S. application Ser. No. 15/590,133, filed on May 9, 2017. Priority is claimed based upon U.S. application Ser. No. 13/926,560, filed on Jun. 25, 2013, and U.S. application Ser. No. 15/590,133, filed on May 9, 2017, which claim the priority date of Taiwanese Patent Application 101140233, filed on Oct. 31, 2012, all of which is incorporated herein by reference.

BACKGROUND

1. Technical Field

The present invention relates to a detection system, and more particularly, to an image detection system.

2. Related Art

An image sensor usually has a plurality of sensing elements, which can convert light into voltages. The voltages can then be converted into digital information forming pictures by a peripheral circuit.

An image sensor can be used to track an object. The image sensor can capture images of an object, generating a plurality of pictures, and the status of the object can be tracked by analyzing the change of the object image in the pictures.

An image sensor can receive light reflected from an object to generate a picture comprising a bright object image. However, in addition to the light reflected from the object, the image sensor receives environmental light when capturing images. In some situations, environmental light may cause a portion of the background of a picture to have high intensity, which may interfere with the determination of an object image. Furthermore, if a picture includes the image of a reflective background object, the image of the reflective background object may interfere with the determination of object images as well. In addition, the image of a background object in a picture may be a source of interference, which may adversely affect the determination of an object image. Thus, in order to accurately determine an object image, the interferences caused by the background and environmental light shall be properly removed.

SUMMARY

In view of the above issues, several embodied detection systems are provided.

One embodiment of the present invention discloses a detection system, which comprises: an image sensor configured to take a first picture of a foreground object and a background object; a lens device attached to the image sensor, configured to allow the foreground object to form a clear image on the first picture and the background object to form a blurred image on the first picture; and a processor configured to determine the image of the foreground object by analyzing the sharpness of the images of the first pictures.

Another embodiment of the present invention discloses a detection system, which comprises: a light source configured to illuminate an object; an image processor configured to receive light reflected from the object, wherein the image processor generates at least one first picture under a first illumination condition and at least one second picture under a second illumination condition different from the first illumination condition; and a processor configured to determine an object image of the object according to the at least one first picture and the at least one second picture.

Another embodiment of the present invention discloses a detection system, which comprises: a light source configured to illuminate an object; an image sensor configured to receive light reflected from the object, wherein the image sensor generates at least one first picture during the time T1 when the light source is turned on, and generates at least one second picture during the time T2 when the light source is turned on, wherein T1 is different from T2; and a processor configured to determine an object image of the object according to the at least one first picture and the at least one second picture.

Another embodiment of the present invention discloses a detection system, which comprises: a light source configured to illuminate an object; an image sensor configured to receive light reflected from the object, wherein the image sensor generates at least one first picture at exposure time T1 when the light source is turned on, and generates at least one second picture at exposure time T2 when the light source is turned on, wherein T1 is different from T2; and a processor configured to determine an object image of the object according to the at least one first picture and the at least one second picture.

One embodiment of the present invention discloses a detection system, which comprises a light source, an image sensor, and a processor. The light source is configured to illuminate an object. The image sensor is configured to receive light reflected from the object. The image sensor is configured to generate at least one first picture when the light source is turned on. The image sensor is configured to generate at least one second picture when the light source is turned off. The processor is configured to compare the at least one first picture with the at least one second picture to determine an object image produced by the object.

Another embodiment of the present invention discloses a detection system, which comprises a light source, an image sensor, and a processor. The light source is configured to illuminate an object. The image sensor is configured to generate a plurality of first pictures when the light source is turned on. The image sensor is configured to generate a plurality of second pictures when the light source is turned off, wherein the first pictures correspond to the second pictures. The processor is configured to obtain a plurality of subtraction pictures, each obtained by subtracting one of the second pictures from a corresponding one of the first pictures, and to compare the subtraction pictures with a background model to determine an object image.

Another embodiment of the present invention discloses a detection system, which comprises an image sensor, a distance-measuring device, and a processor. The image sensor is configured to generate a first picture comprising an image of a foreground object and an image of a background object. The distance-measuring device is configured to provide distance information related to the foreground object and the background object. The processor is configured to determine the image of the foreground object according to the distance information.

To provide a better understanding of the above-described objectives, characteristics and advantages of the present invention, a detailed explanation is provided in the following embodiments with reference to the drawings.

BRIEF DESCRIPTION OF THE DRAWINGS

The invention will be described according to the appended drawings in which.

DETAILED DESCRIPTION OF DISCLOSED EMBODIMENTS

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

Figure 1A:
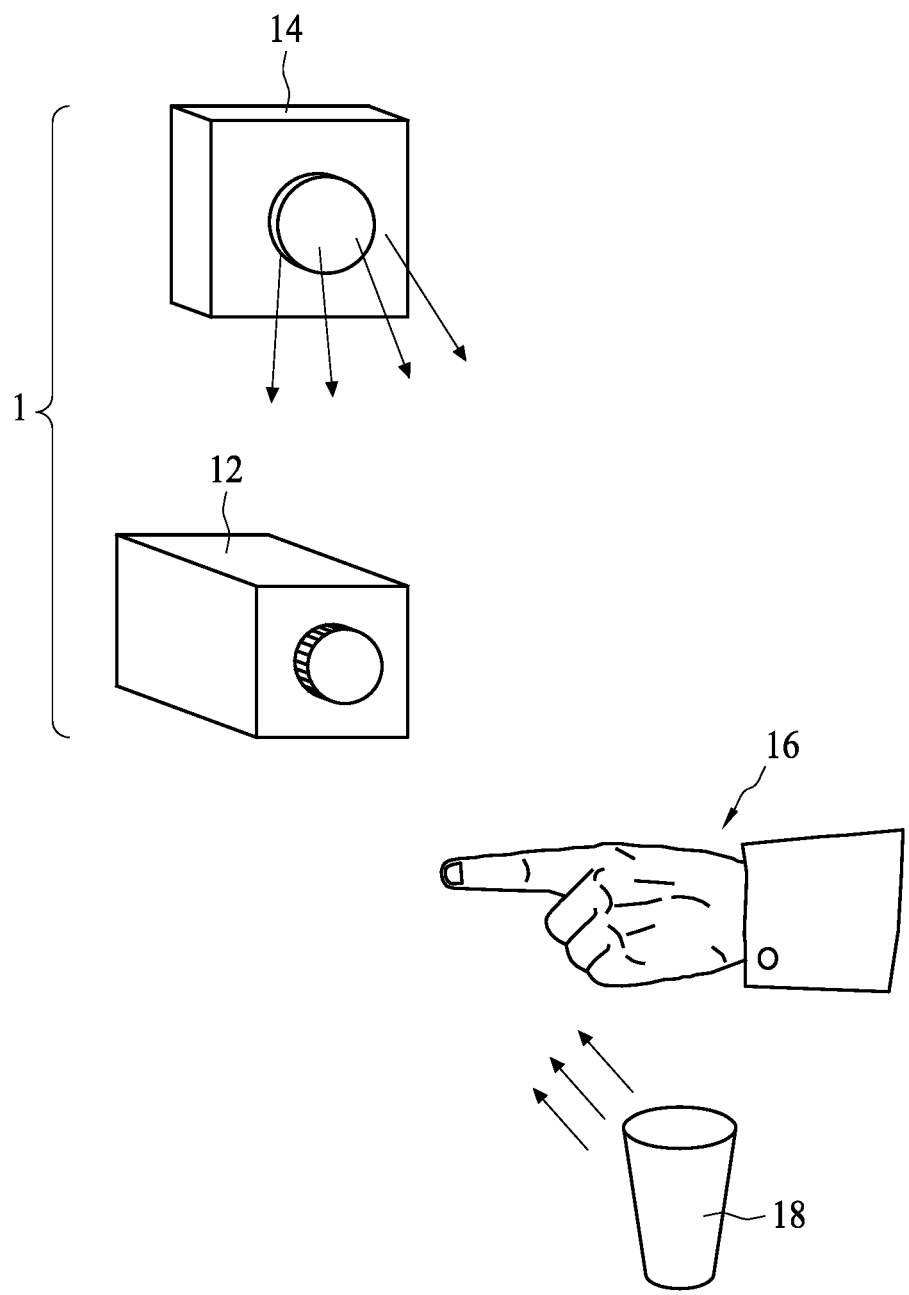
FIG. 1A schematically shows a detection system according to one embodiment of the present invention.
Figure 2:
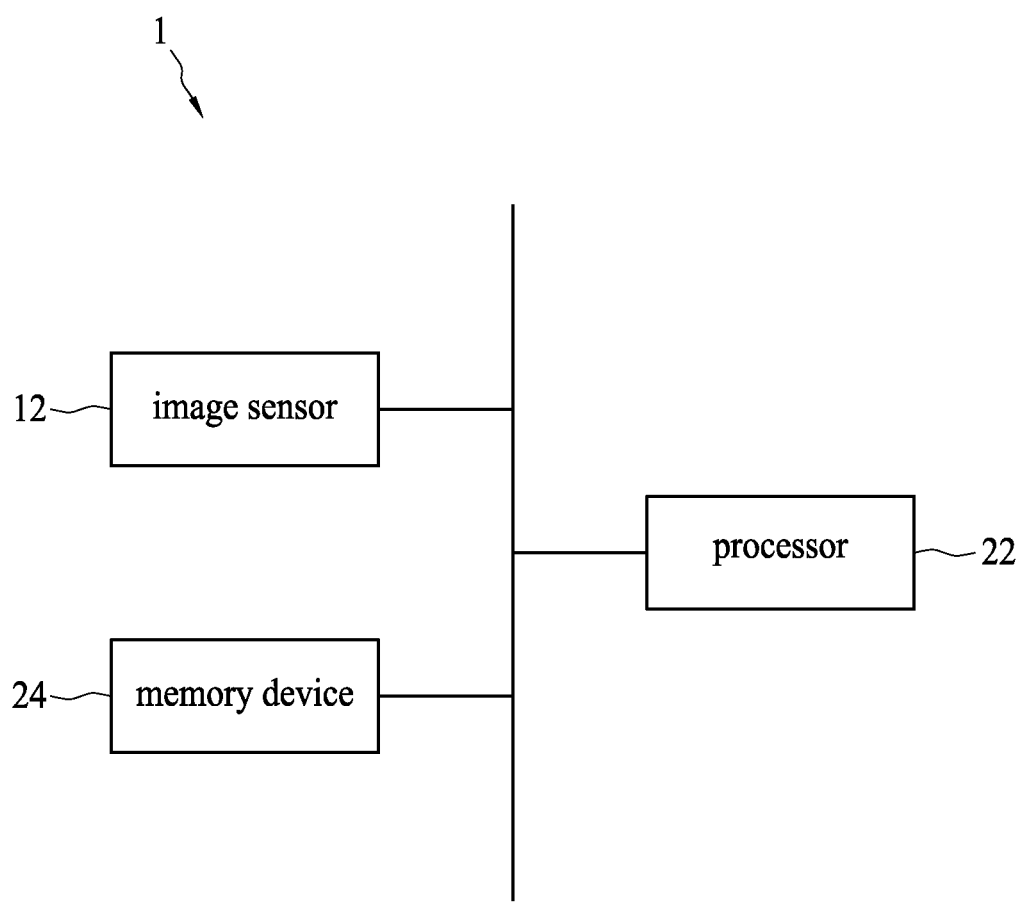
FIG. 2 is a block diagram schematically showing a detection system according to one embodiment of the present invention.

FIG. 1A schematically shows a detection system 1 according to one embodiment of the present invention. FIG. 2 is a block diagram schematically showing a detection system 1 according to one embodiment of the present invention. Referring to FIGS. 1A, and 2, the detection system 1 may comprise an image sensor 12, a light source 14, and a processor 22. The image sensor 12 can be configured to capture an image of an object 16. The light source 14 can be configured to illuminate the object 16 to allow the object 16 to form a bright object image on a picture generated by the image sensor 12. The processor 22 can be coupled with the image sensor 12 to process the pictures from the image sensor 12. The detection system 1 may further comprise a memory device 24, which can be configured as a storage for pictures from the image sensor 12.

Figure 1B:
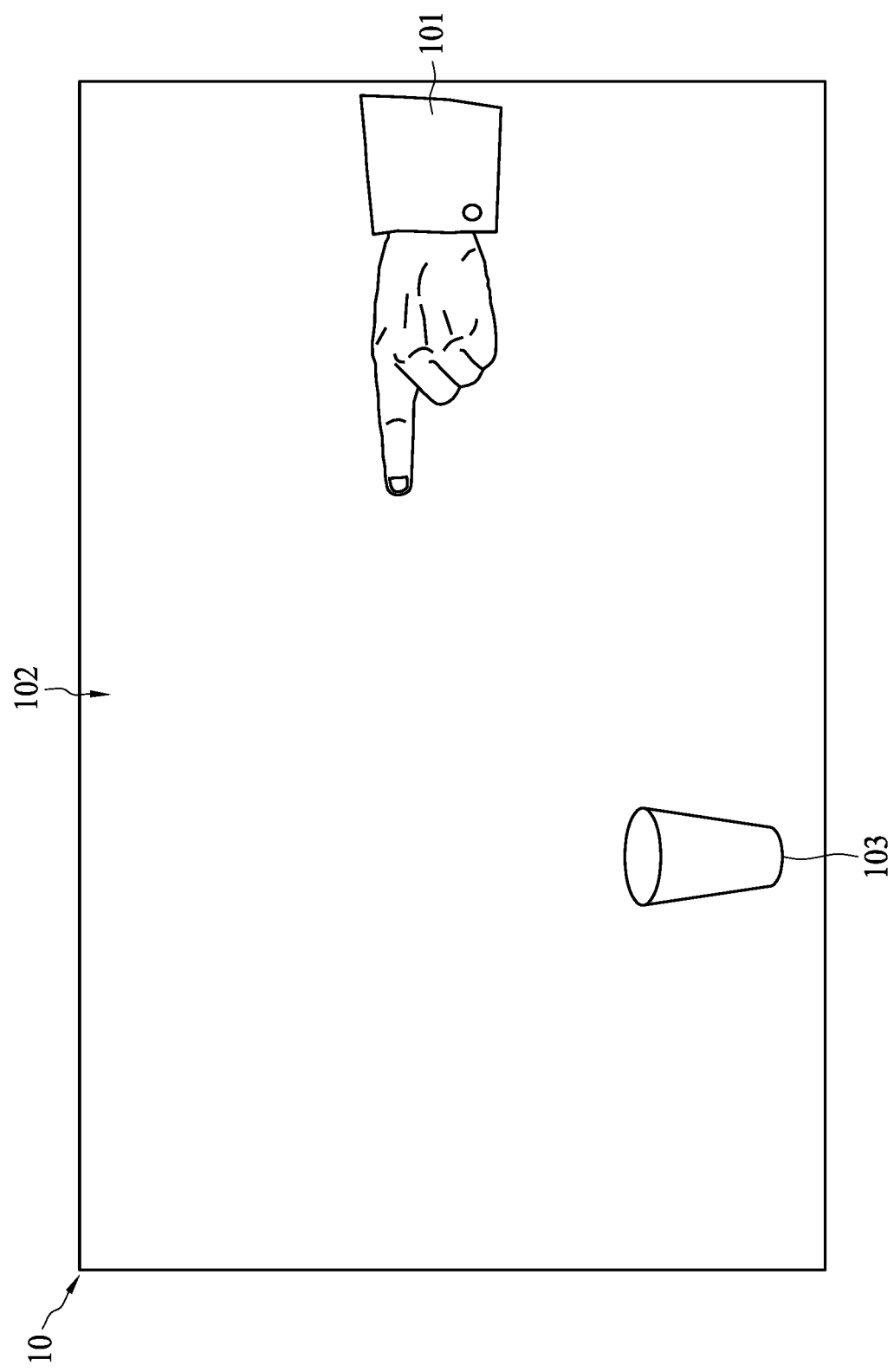
FIG. 1B schematically shows a picture according to one embodiment of the present invention.

FIG. 1B schematically shows a picture according to one embodiment of the present invention. Referring to FIGS. 1A and 1B, the image sensor 12 can take an image of the object 16 and generate a picture 10. The picture 10 may comprise the image 101 of the object 16 and background image 102, in which the image 103 of a background object 18 may be a part of the background image 102.

The object 16 can be any physical object, which is not limited to a hand illustrated in the present embodiment.

The image sensor 12 may be a CMOS image sensor, CCD image sensor, or the like. The image sensor 12 can capture images at a high frame rate, such as 960 fps.

Figure 3:
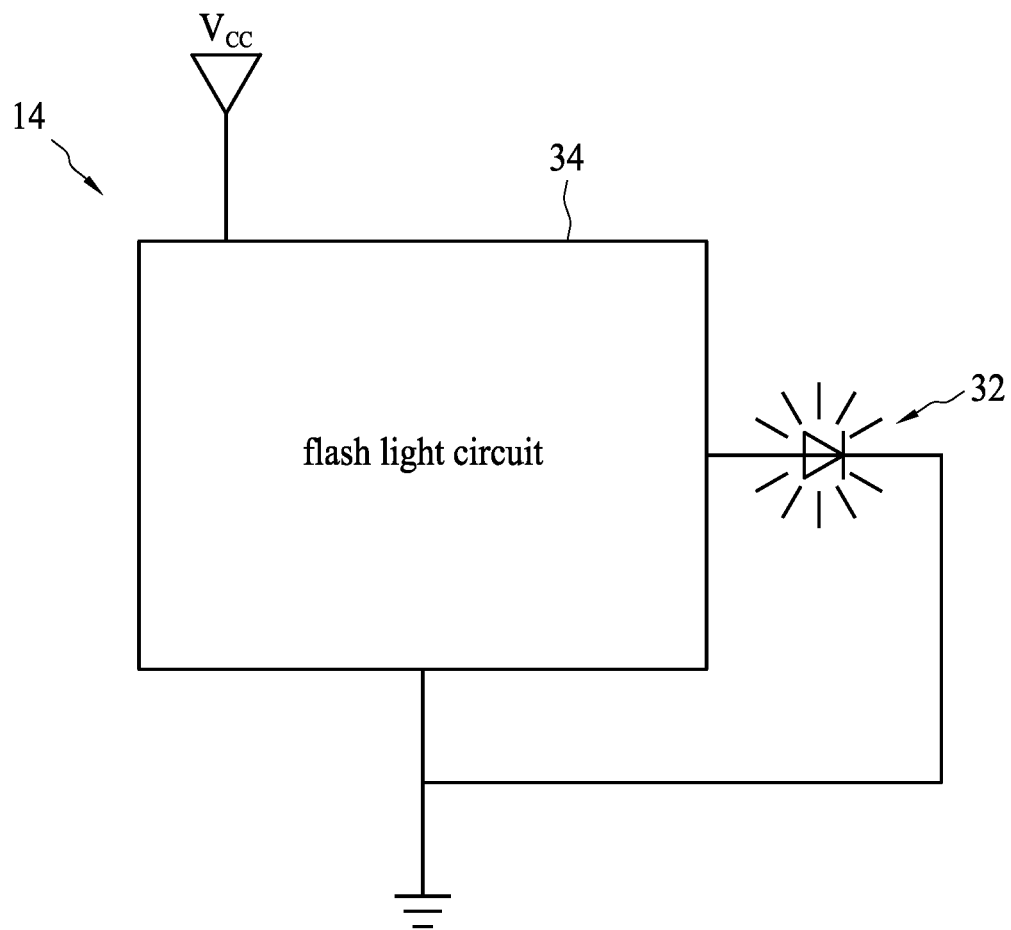
FIG. 3 is a functional diagram of a light source according to one embodiment of the present invention.

Referring to FIG. 3, the light source 14 may comprise a light-emitting element 32, which may be a light bulb, light emitting diode, or other suitable light sources. The light source 14 may further comprise a flash light circuit 34, which may be coupled with the light-emitting element 32. A power supply Vcc can provide the flash light circuit 34 with electrical power. The flash light circuit 34 can supply electrical pulses to the light-emitting element 32 to cause it to flash at regular intervals.

The frequency of the light source 14 can be matched to the frame rate of the image sensor 12. As such, the object images intermittently appear in successively generated pictures.

Figure 4:
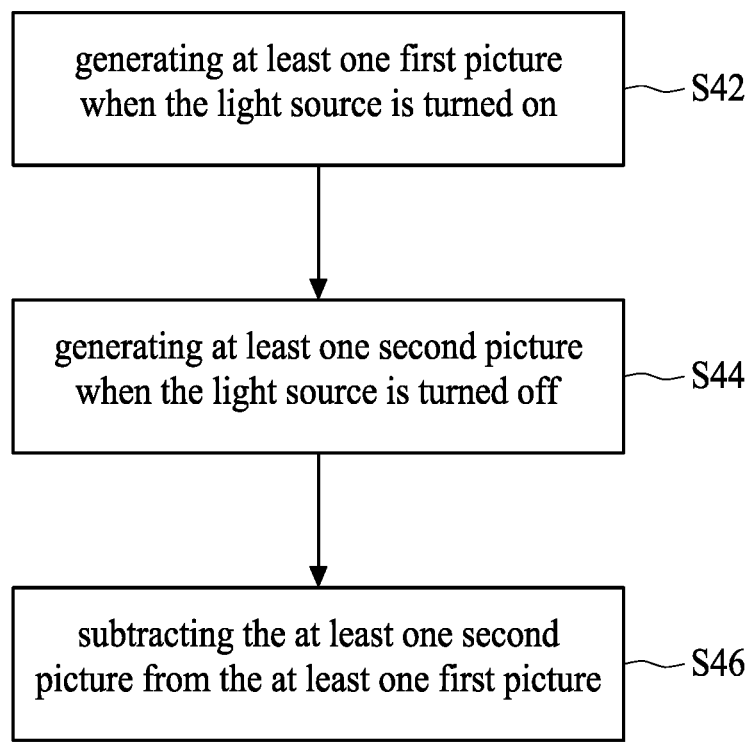
FIG. 4 is a flow diagram showing the steps of a method of removing background interferences according to one embodiment of the present invention.

FIG. 4 is a flow diagram showing the steps of a method of removing background interferences according to one embodiment of the present invention. Referring to FIGS. 1A to 4, when the image sensor 12 captures the image of the object 16, the image sensor 12 simultaneously receives environmental light. Furthermore, if there is a background object 18 located behind the object 16, the background object 18 may create an image on the pictures generated by the image sensor 12. The ambient light noise caused by the environmental light and the image created by the background object 18 under environmental light can be removed by the following steps.

In Step S42, the image sensor 12 generates at least one first picture (P1) when the light source 14 is turned on, wherein the at least one first picture (P1) may comprise the image formed by the light of the light source 14 reflected from the object 16, the ambient light noise caused by the environmental light, and the image formed by the background object 18 illuminated by environmental light. In Step S44, the image sensor 12 generates at least one second picture (P2) when the light source 14 is turned off. Since the light source 14 is turned off, the at least one second picture (P2) does not include the image formed by the light of the light source 14 reflected from the object 16 while still including the ambient light noise caused by the environmental light and the image formed by the background object 18 illuminated by environmental light. In Step S46, the processor 22 subtracts the at least one second picture from the at least one first picture (P1−P2) to obtain a subtraction picture. The subtraction of the at least one second picture from the at least one first picture can remove the ambient light noise caused by the environmental light and the background image formed due to environmental light. As a result, the processor 22 can easily determine the object image created by the object 16 from the subtraction picture.

In some embodiments, the first picture comprises a plurality of pixels, and the second picture comprises a plurality of pixels corresponding to the pixels of the first picture, wherein the subtraction of the at least one second picture from the at least one first picture is performed by subtracting pixel data of each pixel of the second picture from pixel data of the corresponding pixel of the first picture.

In some embodiments, the pixel data may be of grey scale intensity. In some embodiments, the pixel data may be of one RGB component or a combination of at least two RGB components. In some embodiments, the pixel data may be of one HSV component or a combination of at least two HSV components. In some embodiments, the first and second pictures can be continuously generated.

In some embodiments, the processor 22 is configured to determine the position of the object image in the subtraction picture. In some embodiments, the processor 22 is configured to generate coordinate data according to the position of the object image.

In some embodiments, the image sensor 12 generates a plurality of first pictures when the light source 14 is turned on. The processor 22 calculates a plurality of subtraction pictures by subtracting the second picture from each first picture.

In some embodiments, the processor 22 can determined a distance between the object 16 and the image sensor 12 by a dimension of the object image measured from the subtraction picture. In some embodiments, the processor 22 can determine the change of distance between the object 16 and the image sensor 12 by the change of dimension measured from the subtraction picture. In some embodiments, the processor 22 can determine the gesture performed by the object 16 by the change of positions of the object image of the plurality of subtraction pictures. In some embodiments, the processor 22 can determine a distance or the change of distance between the object 16 and the image sensor 12 by the change of intensity of the object images in the plurality of subtraction pictures.

In some situations, after two pictures are subtracted, noises cannot be completely removed. At this moment, the detection system 1 may use more pictures to remove the interferences in the determination of the object image. In some embodiments, the image sensor 12 generates two first pictures when the light source 14 is turned on, and generates one second picture when the light source 14 is turned off. The processor 22 equalizes the two first pictures to obtain an average picture. The processor 22 then subtracts the second picture from the average picture. In some embodiments, the image sensor 12 generates one first picture when the light source 14 is turned on, and generates two second pictures when the light source 14 is turned off. The processor 22 equalizes the two second pictures to obtain an average picture. The processor 22 then subtracts the average picture from the first picture. In some embodiments, the method of using two first pictures and one second picture or using one first picture and two second pictures to remove the interferences in the determination of an object image can be applied with an image sensor 12 having a high frame rate of at least 960 fps such that an improved removal effect can be achieved.

Above all, other methods of removing the interferences caused by environmental light are provided below.

Figure 8:
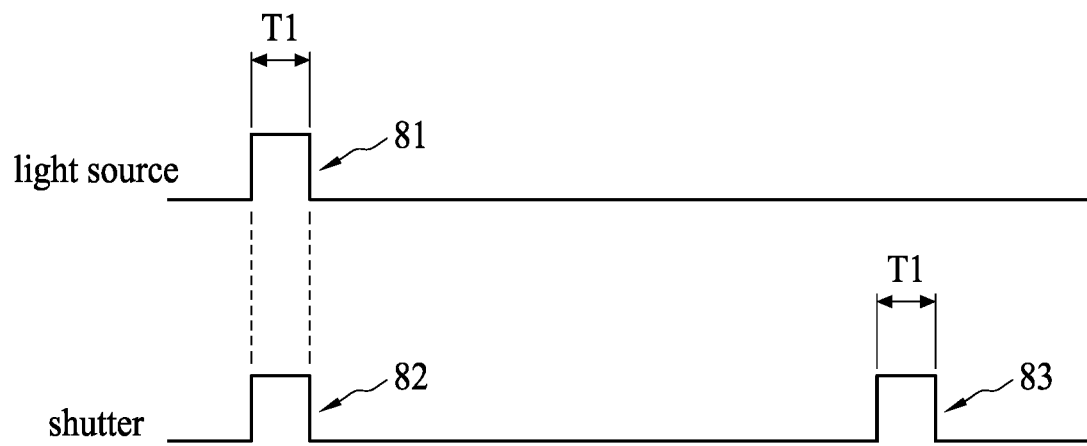
FIG. 8 is a timing diagram of the operations of a light source and the electronic shutter of an image sensor according to one embodiment of the present invention.

FIG. 8 is a timing diagram of the operations of a light source and the electronic shutter of an image sensor according to one embodiment of the present invention. As shown in FIG. 8, a signal 81 is provided for a light source, and simultaneously, a shutter open signal 82 is provided for an image sensor so that the image sensor generates a first picture (Image1) under the illumination of the light source and environmental light. The signal 81 and the signal 82 can have the same period T1, for example, milliseconds. When the light source is turned off, another shutter open signal 83 is provided for the image sensor such that the image sensor generates a second picture (Image2) under environmental light. The signal 83 can have a period of T1, for example, milliseconds. The interference caused by the environmental light can be removed by subtracting the second picture from the first picture (Image1−Image2).

Figure 9:
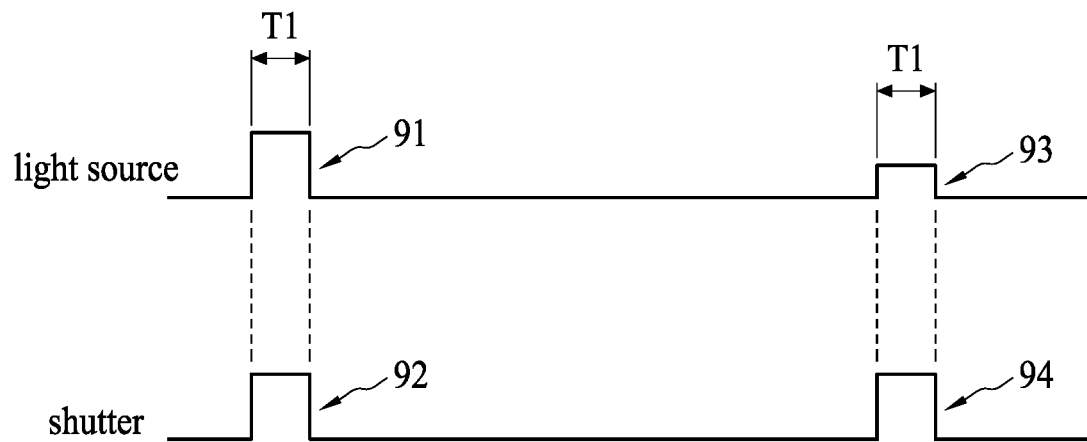
FIG. 9 is a timing diagram of the operations of a light source and the electronic shutter of an image sensor according to another embodiment of the present invention.

FIG. 9 is a timing diagram of the operations of a light source and the electronic shutter of an image sensor according to another embodiment of the present invention. As shown in FIG. 9, a signal 91 is provided for a light source, and simultaneously, a shutter open signal 92 is provided for an image sensor so that the image sensor generates a first picture (Image1) under the illumination of the light source and environmental light. The signal 91 and the signal 92 can have the same signal level and the same period T1, for example, milliseconds. Moreover, a signal 93 is provided for a light source, and simultaneously, a shutter open signal 94 is provided for an image sensor so that the image sensor generates a second picture (Image2) under the illumination of the light source and environmental light. The signal 93 and the signal 94 can have the same period T1, for example, milliseconds, but the signal level of the signal 91 is N times higher than that of the signal 93, where N is not equal to one. Using the following equation (1), a subtraction picture without interferences from environmental light can be obtained.

$$ObjectImage = (Image1 - Image2) \times \frac{N}{N-1} \quad (1)$$

Figure 10:
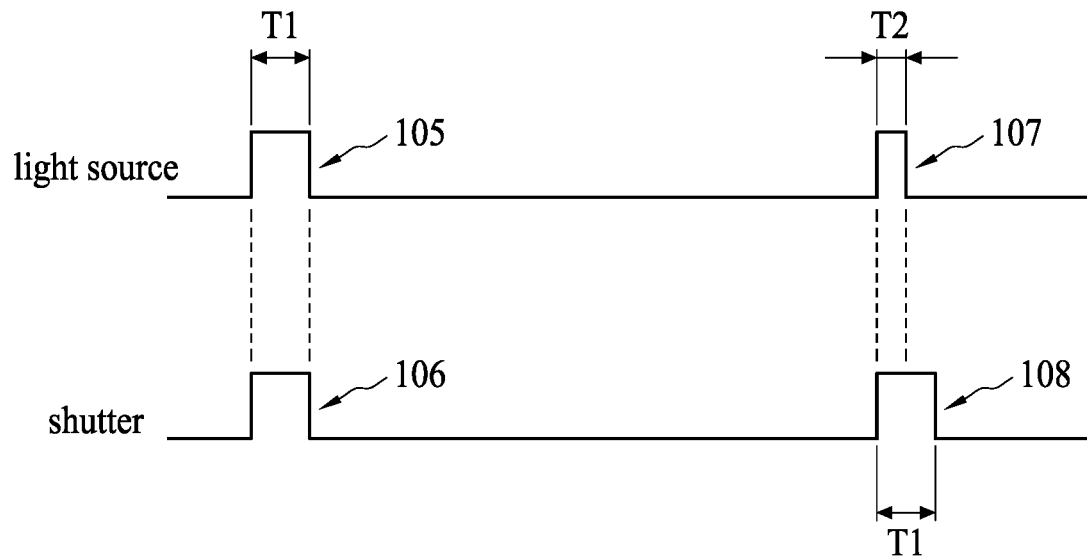
FIG. 10 is a timing diagram of the operations of a light source and the electronic shutter of an image sensor according to another embodiment of the present invention.

FIG. 10 is a timing diagram of the operations of a light source and the electronic shutter of an image sensor according to another embodiment of the present invention. As shown in FIG. 10, a signal 105 is provided for a light source, and simultaneously, a shutter open signal 106 is provided for an image sensor so that the image sensor generates a first picture (Image1) under the illumination of the light source and environmental light. The signal 105 and the signal 106 can have the same signal level and the same period of T1, for example, milliseconds. A signal 107 is provided for a light source, and simultaneously, a shutter open signal 108 is provided for an image sensor so that the image sensor generates a second picture (Image2) under the illumination of the light source and environmental light. The period T1 of the signal 105 can be N times higher than the period T2 of the signal 107, wherein N is not equal to one. The signal 1108 has a period of T1. A subtraction picture without interferences from environmental light can be obtained through the following equation (2).

$$ObjectImage = (Image1 - Image2) \times \frac{N}{N-1} \quad (2)$$

Figure 11:
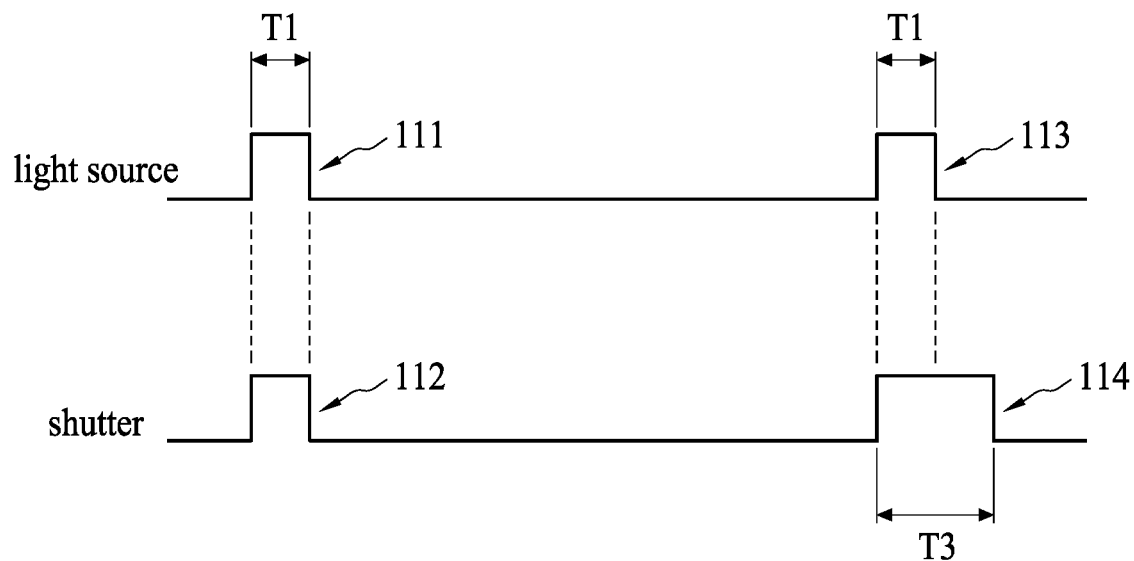
FIG. 11 is a timing diagram of the operations of a light source and the electronic shutter of an image sensor according to another embodiment of the present invention.

FIG. 11 is a timing diagram of the operations of a light source and the electronic shutter of an image sensor according to another embodiment of the present invention. As shown in FIG. 11, a signal 111 is provided for a light source, and simultaneously, a shutter open signal 112 is provided for an image sensor so that the image sensor generates a first picture (Image1) under the illumination of the light source and environmental light. The signal 111 and the signal 112 can have the same signal level and the same period of T1, for example, milliseconds. A signal 113 is provided for a light source, and simultaneously, a shutter open signal 114 is provided for an image sensor so that the image sensor generates a second picture (Image2) under the illumination of the light source and environmental light. The signal 113 can have a period of T1. The signal 114 has a period of T3 milliseconds, for example, wherein T3 is N times higher than T1, and N is not equal to one. The interferences from environmental light can be removed through the following equation (3).

$$\text{Object Image} = (\text{Image1} \times N - \text{Image2})/(N-1) \quad (3)$$

In some situations, the detection system 1 can utilize more pictures to remove the interferences affecting the determination of an object image. In some embodiments, the image sensor 12 generates a plurality of first pictures ($I_1$, $I_3$, ... ) when the light source 14 is turned on, and generates a plurality of second pictures ($I_2$, $I_4$, ... ) when the light source 14 is turned off, wherein the image sensor 12 alternately generates the first and second pictures ($I_1$, $I_2$, $I_3$, ... $I_{N+3}$). The processor 22 uses the following equations (4) to (6) to calculate a computed picture ($I_{computed}$)

$$I_{computed} = \frac{1}{K}\sum_{i=1}^{N+3} \alpha_i \times I_i \quad (4)$$

$$\sum_{i=1}^{N+3} \alpha_i = 0 \quad (5)$$

$$K = \sum_{i=1}^{\left[\frac{(N+3)}{2}\right]} \alpha_{2\times i-1} \quad (6)$$

where N is a positive integer, and the absolute value of $|\alpha_{i1}|$ ($|\alpha_1|$, ..., $|\alpha_{N+3}|$) are binomial coefficients.

For example, in some embodiments, when N is equal to one, the image sensor 12 alternately generates two first pictures ($I_1$ and $I_3$) and two second pictures ($I_2$ and $I_4$). At this instance, $\alpha_i$ can be either (1, -3, 3, -1) or (-1, 3, -3, 1), and the computed picture ($I_{computed}$) can be:

$$I_{computed} = \frac{I_1 - 3I_2 + 3I_3 - I_4}{4}; \text{ or} \quad (7)$$

$$I_{computed} = \frac{-I_1 + 3I_2 - 3I_3 + I_4}{4} \quad (8)$$

In some embodiments, when N is two, $\alpha_i$ can be either (1, -4, 6, -4, 1) or (-1, 4, -6, 4, -1).

Referring back to FIGS. 1A and 1B, some non-object images may appear in the first picture(s) generated when the light source 14 is turned on, but do not appear in the second picture(s) when the light source 14 is turned off, and such non-object images cannot be removed using the aforementioned subtraction methods but they can be removed by a background model. Such non-object image may be formed by a background object 18 reflecting light from the light source 14 when it turned on or formed by the light reflected from the cloths of an operator.

Figure 5:
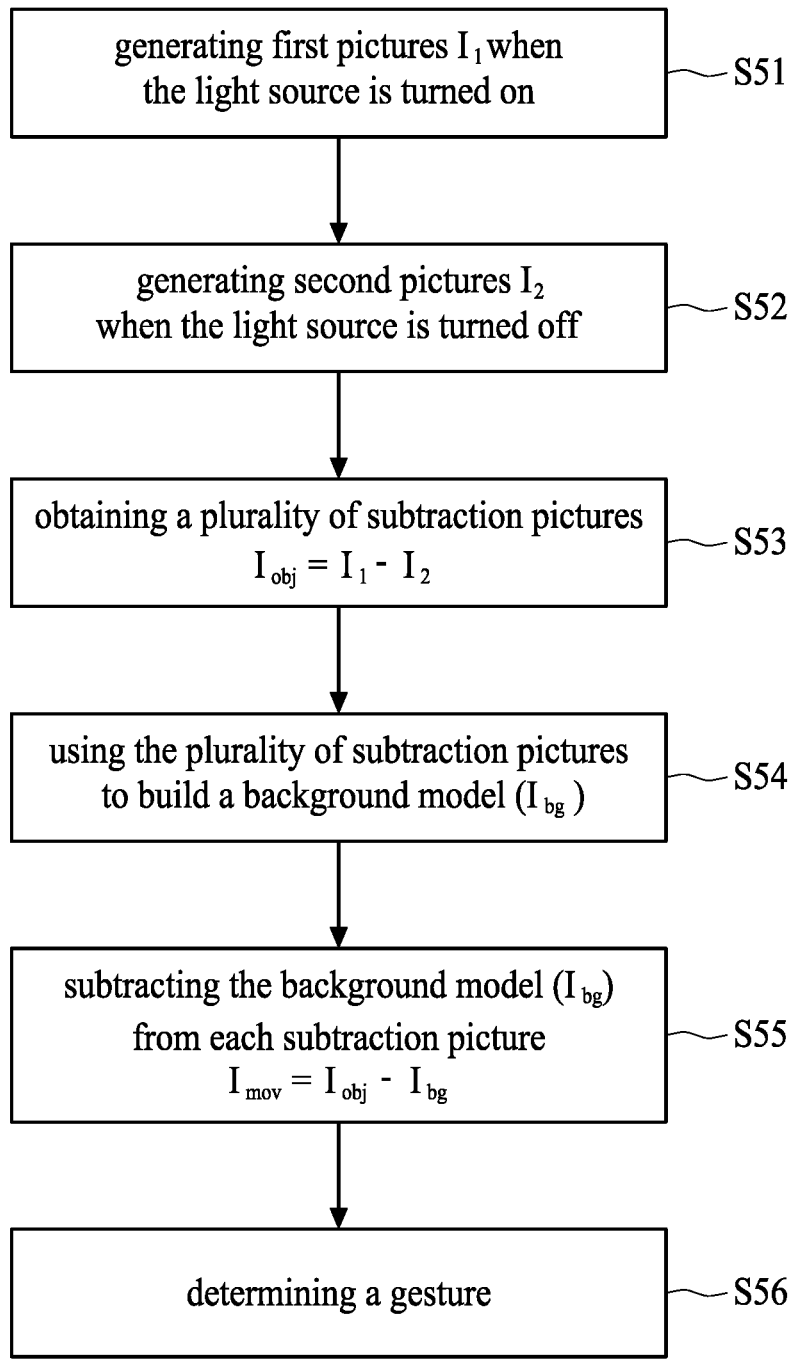
FIG. 5 is a flow chart showing a method of tracking a moving object or determining a gesture using pictures obtained when the light source is turned on and off.

FIG. 5 is a flow chart showing a method of tracking a moving object or determining a gesture using pictures obtained when the light source is turned on and off. In Step S51, a first picture ($I_1$) is generated when the light source is turned on. In Step S52, a second picture ($I_2$) is generated when the light source is turned off. In Step S53, a subtraction picture ($I_{obj}=I_1-I_2$) is obtained by subtracting the second picture ($I_2$) from the first picture ($I_1$). In Step S54, Steps S51 to S53 are repeated to obtain a plurality of subtraction pictures ($I_{obj}$). Next, the plurality of subtraction pictures ($I_{obj}$) is used to build a background model ($I_{bg}$). In some embodiments, the background model ($I_{bg}$) is built using the pixels that are significantly darker or unchanged in the plurality of subtraction pictures ($I_{obj}$). In Step S55, the background model ($I_{bg}$) is subtracted from each subtraction picture ($I_{obj}$) to obtain a plurality of pictures ($I_{mov}$). Subsequently, the moving object images can be determined by the change of object images of the plurality of pictures ($I_{mov}$). In Step S56, a gesture performed by the object can be determined according to the change of positions of the moving object images of the plurality of pictures ($I_{mov}$).

In some embodiments, the background model can be updated, and the following equation (9) can be used for updating.

$$B_{i,j}^{new} = \omega_{i,j} B_{i,j}^{old} + (1-\omega_{i,j}) P_{i,j} \quad (9)$$

where $B_{i,j}^{old}$ is pixel data of a pixel (i, j) of the original background model, $\omega_{i,j}$ is a weight number, $P_{i,j}$ is pixel data of a pixel (i, j) of a subtraction picture ($I_{obj}$), and $B_{i,j}^{new}$ is pixel data of a pixel (i, j) of an updated background model.

In some embodiments, the processor 22 can use the object images of pictures to update the background model.

In some embodiments, each pixel of the background model corresponds to the same weight number. In some embodiments, each pixel of the background model corresponds to a different weight number. In some embodiments, a portion of pixels of the background model correspond to the same weight number.

The weight number related to at least one pixel of the background model is adjustable. In some embodiments, when the processor 22 is updating the background model, the processor 22 may compare $B_{i,j}^{old}$ with $P_{i,j}$. When the difference between $B_{i,j}^{old}$ and $P_{i,j}$ is greater than a predetermined value, $\omega_{i,j}$ can be adjusted higher such that the updated background model will not be changed significantly. In one embodiment, when the difference between the pixel data of a pixel of an object image of a picture and the pixel data of a corresponding pixel of the background model is greater than a predetermined value, the processor 22 may adjust the weight number corresponding to the pixel of the object image.

In some embodiments, the image sensor 12 of the detection system 1 generates a plurality of pictures when the light source 14 is turned on and off. The processor 22 calculates a plurality of subtraction pictures using the pictures. The processor 22 determines the object image of each subtraction picture by a background model. If the processor 22 determines that the object images of the subtraction pictures are at different positions (i.e. the object is moving when the pictures are generated), the processor 22 will not update the background model with the subtraction pictures. If the processor 22 determines that the positions of the object images of the pictures are almost unchanged or the object images do not move, the processor 22 will use at least one subtraction picture to update the background model.

If the positions of two object images are not changed, it could mean that the two object images are located at the same position or the difference between the points, for example the center of gravity, representing the two object images along a direction is not greater than a percentage, for example 20%, of the width of the object image along the direction.

Figure 6:
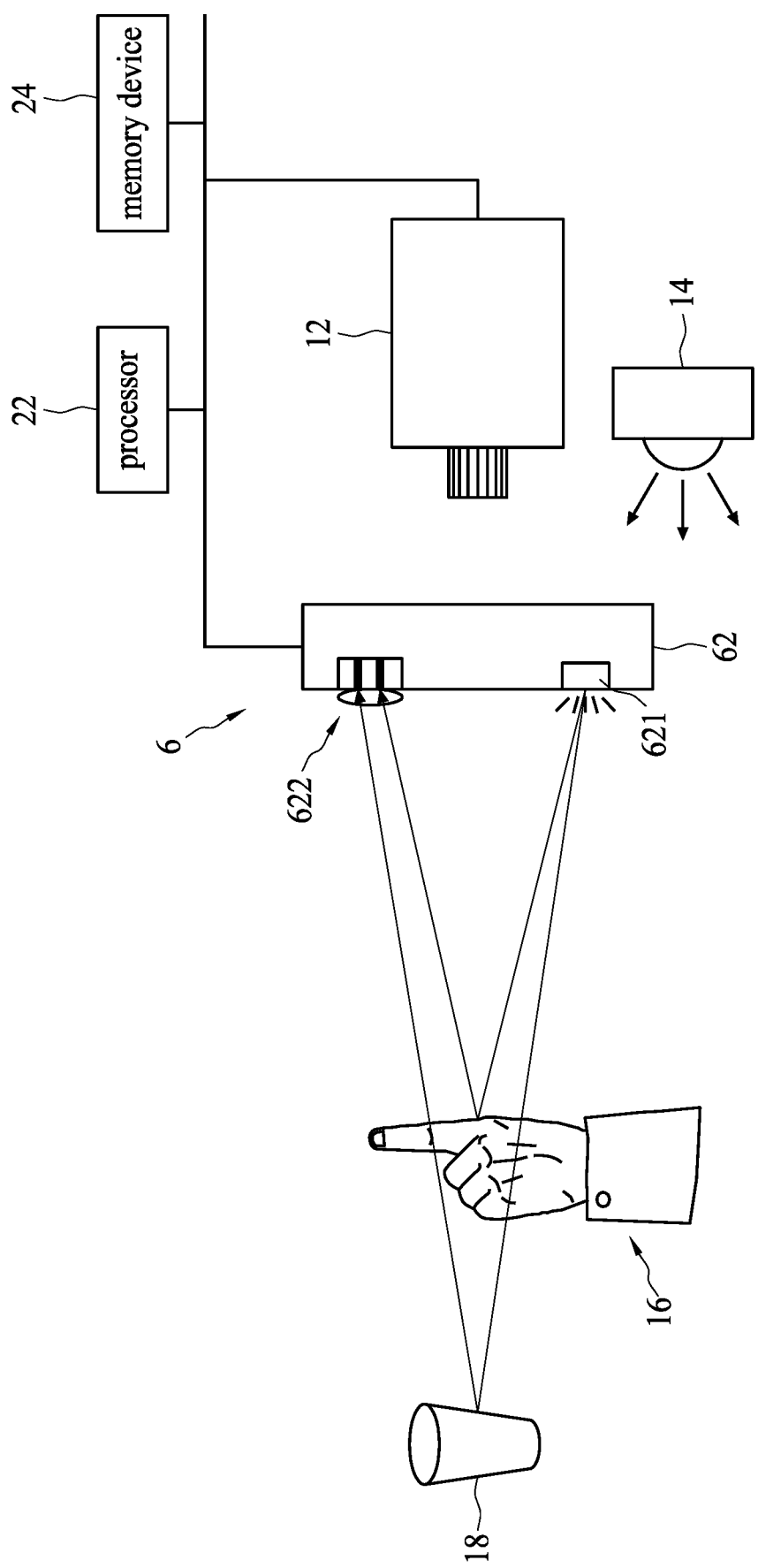
FIG. 6 schematically shows a detection system according to one embodiment of the present invention.

FIG. 6 schematically shows a detection system 6 according to one embodiment of the present invention. As shown in FIG. 6, compared with the detection system 1 of FIGS. 1A and 2, the detection system 6 further comprises a distance-measuring device 62, which can measure distances between a plurality of targets and the detection system 6. The detection system 6 can determine which target is a foreground target and which target is in the background by the distances. In one embodiment, the distance-measuring device 62 can measure the distance between the object 16 and the detection system 6 and the distance between the object 18 and the detection system 6. The processor 22 uses the distances obtained by the pictures generated by the image sensor 12 to distinguish the foreground object 16 from the background object 18. In one embodiment, the processor 22 compares the distances with a predetermined value to distinguish the foreground object 16 from the background object 18, wherein the distance between the foreground object 16 and the detection system 6 is less than the predetermined value. In some embodiments, the distance-measuring device 62 is configured to measure distances by triangulation, which may comprise a light source 621 and a multi-pixel array 622. The distance between an object and the detection system 6 can be estimated by the location of the spot of reflected light on the multi-pixel array 622.

Figure 7:
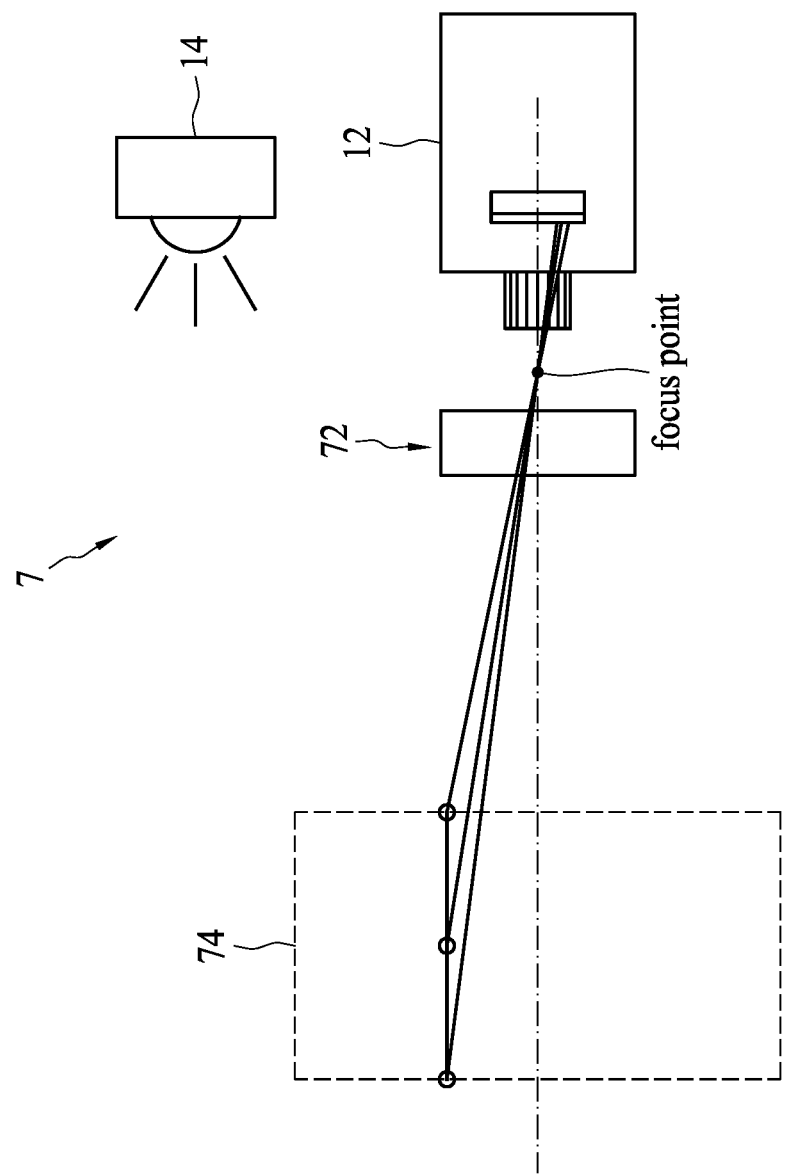
FIG. 7 schematically shows a detection system according to another embodiment of the invention.

FIG. 7 schematically shows a detection system 7 according to another embodiment of the invention. Referring to FIG. 7, compared with the detection system 1 of FIGS. 1A and 2, the detection system 7 further comprises a lens device 72, which is utilized by the detection system 7 to distinguish the foreground object from the background. The detection system 7 defines a performance region 74 corresponding to the depth of field (DOF) of the lens device 72. The object in the performance region 74 can form a clear image while the object outside the performance region 74 forms a blurred image. Accordingly, with the analysis of the sharpness of images in pictures, the processor 22 can determine which object is in the performance region 74, thereby distinguishing the foreground object from the background.

Amplitude, variance, or other methods can be applied to evaluate the sharpness of the images of pictures. The details can refer to a paper by Chern N. K. et al., entitled "PRACTICAL ISSUES IN PIXEL-BASED AUTOFOCUSING FOR MACHINE VISION," Proceedings of the 2001 IEEE International Conference on Robotics & Automation, Seoul, Korea, May 21-26, 2001.

The embodied detection system can use different methods to remove the interferences caused by the background so that the determination of object images can be more accurate.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

It will be apparent to those skilled in the art that various modifications can be made to the disclosed embodiments. It is intended that the specification and examples be considered as exemplary only, with the true scope of the disclosure being indicated by the following claims and their equivalents.

What is claimed is:

1. A detection system, comprising:
a light source configured to illuminate an object;
an image sensor configured to receive a reflected light from the object, generate a first picture based on a first length time of exposure with the light source turned on, and generate a second picture based on a second length time of exposure with the light source turned on, wherein the first length time is different from the second length time; and
a processor configured to determine an image of the object according to the following expression:

Object Image=[(Image1*$N$)−Image2]/($N$−1)

where Object Image represents the image of the object; Image1 represents the first picture; Image2 represents the second picture; and N represents a ratio of the second length time to the first length time, wherein N is not equal to one.

* * * * *